United States Patent
Nakata et al.

(10) Patent No.: US 10,885,447 B2
(45) Date of Patent: Jan. 5, 2021

(54) DATA PROCESSING METHOD AND DATA PROCESSING SYSTEM

(71) Applicant: Panasonic Intellectual Property Corporation of America, Torrance, CA (US)

(72) Inventors: Yohei Nakata, Osaka (JP); Sotaro Tsukizawa, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 107 days.

(21) Appl. No.: 16/256,335

(22) Filed: Jan. 24, 2019

(65) Prior Publication Data

US 2019/0236463 A1 Aug. 1, 2019

Related U.S. Application Data

(60) Provisional application No. 62/623,137, filed on Jan. 29, 2018.

(30) Foreign Application Priority Data

Sep. 21, 2018 (JP) .................................. 2018-177725

(51) Int. Cl.
  *G06N 5/04* (2006.01)
  *G06N 3/04* (2006.01)
  (Continued)

(52) U.S. Cl.
  CPC ........... *G06N 5/04* (2013.01); *G06K 9/00536* (2013.01); *G06N 3/0454* (2013.01); *G06N 3/063* (2013.01);
  (Continued)

(58) Field of Classification Search
  None
  See application file for complete search history.

(56) References Cited

U.S. PATENT DOCUMENTS

| 9,990,687 B1* | 6/2018 | Kaufhold | G06N 3/0454 |
| 2007/0106582 A1* | 5/2007 | Baker | G06Q 40/08 |
| | | | 705/35 |
| 2017/0249445 A1* | 8/2017 | Devries | A61B 5/1455 |

FOREIGN PATENT DOCUMENTS

WO 2017/038104 3/2017

OTHER PUBLICATIONS

Extended European Search Report dated Jun. 28, 2019 in corresponding European Patent Application No. 19153167.2.
(Continued)

*Primary Examiner* — Fayyaz Alam
(74) *Attorney, Agent, or Firm* — Wenderoth, Lind & Ponack, L.L.P.

(57) ABSTRACT

In a data processing method executed by a computer: inputting, in a third trained model, first output data corresponding to first input data for a first trained model to obtain second output data, the third trained model being acquired through training in which (i) output data of the first trained model is used as training data, and (ii) output data of a second trained model acquired by converting the first trained model is used as label data; obtaining first label data of the first input data; and retraining the first trained model using first differential data corresponding to differences between the second output data and the first label data.

10 Claims, 5 Drawing Sheets

(51) Int. Cl.
*G06N 3/063* (2006.01)
*G06N 3/08* (2006.01)
*G06N 20/00* (2019.01)
*G06K 9/00* (2006.01)

(52) U.S. Cl.
CPC .............. *G06N 3/08* (2013.01); *G06N 3/084* (2013.01); *G06N 20/00* (2019.01)

(56) References Cited

OTHER PUBLICATIONS

Carreira-Perpiñán, M., "Model compression as constrained optimization, with application to neural nets. Part I. general framework", XP080774406, Jul. 2017.
Benoit Jacob, et al., "Quantization and Training of Neural Networks for Efficient Integer-Arithmetic-Only Inference", Retrieved from https://arxiv.org/abs/1712.05877, Dec. 15, 2017.

* cited by examiner

DATA PROCESSING METHOD AND DATA PROCESSING SYSTEM

CROSS REFERENCE TO RELATED APPLICATION

This application claims the benefit of priority of U.S. Provisional Application No. 62/623,137 filed on Jan. 29, 2018 and Japanese Patent Application Number 2018-177725 filed on Sep. 21, 2018, the entire contents of which are hereby incorporated by reference.

BACKGROUND

1. Technical Field

The present disclosure relates to a data processing system for executing machine learning and a data processing method performed therewith.

2. Description of the Related Art

In recent years, techniques related to compression of a trained model acquired through machine learning, and adoption thereof in an embedded system have been proposed. Techniques proposed as such include means for enhancing performance of the trained model after the adoption thereof in the embedded system (see, for example, Patent Literature (PTL) 1 (International Application Publication No. WO2017/038104) and Non Patent Literature (NPL) 1 (Jacob et al., (2017, Dec. 15). Quantization and Training of Neural Networks for Efficient Integer-Arithmetic-Only Inference. Retrieved from https://arxiv.org/abs/1712.05877)).

SUMMARY

However, the above conventional techniques cannot be used when contents of a conversion tool for converting the trained model are unknown (i.e., the conversion tool is a black box).

Accordingly, the present disclosure provides a data processing method and the like capable of enhancing the performance of the trained model after having been converted even when the contents of the conversion tool for converting the trained model are unknown.

In a data processing method according to an aspect of the present disclosure, using a computer: inputting, in a third trained model, first output data corresponding to first input data for a first trained model to obtain second output data, the third trained model being acquired through training in which (i) output data of the first trained model is used as training data, and (ii) output data of a second trained model acquired by converting the first trained model is used as label data; obtaining first label data of the first input data; and retraining the first trained model using first differential data corresponding to differences between the second output data and the first label data.

A data processing system according to an aspect of the present disclosure, including the computer: inputs, in the third trained model, the first output data corresponding to the first input data for the first trained model to obtain the second output data, the third trained model being acquired through training in which (i) the output data of the first trained model is used as training data, and (ii) the output data of the second trained model acquired by converting the first trained model is used as label data; obtains the first label data of the first input data; and retrains the first trained model using the first differential data corresponding to differences between the second output data and the first label data.

Note that this comprehensive or concrete aspect of the present disclosure may be realized on a device, integrated circuit, computer program, or a recording medium such as a computer-readable CD-ROM, and may also be realized by optionally combining devices, integrated circuits, computer programs, and recording media.

The data processing method and data processing system in the present disclosure are capable of enhancing the performance of the trained model after having been converted even when the contents of the conversion tool for converting the trained model are unknown.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Underlying Knowledge Forming Basis of Present Disclosure

The inventors have identified the following problems related to compression of models acquired through the above machine learning (hereinafter, also referred to as trained models) and adoption thereof in an embedded system.

Embedded systems ordinarily have a lower operating speed, smaller memory size, and less available electric power than systems in an environment in which trained models are built. For example, a number format such as 32 bit floating point (FP32) and a computer capable of processing such a large number format in a short amount of time are used in training to obtain higher precision. In embedded systems, the scale of a processing circuit is, on the other hand, limited depending on the embedded system. Moreover, in embedded systems used in an environment in which usable electric power is limited, such as in automobiles, electric power consumption of the processing circuit also needs to be considered.

Figure 1:
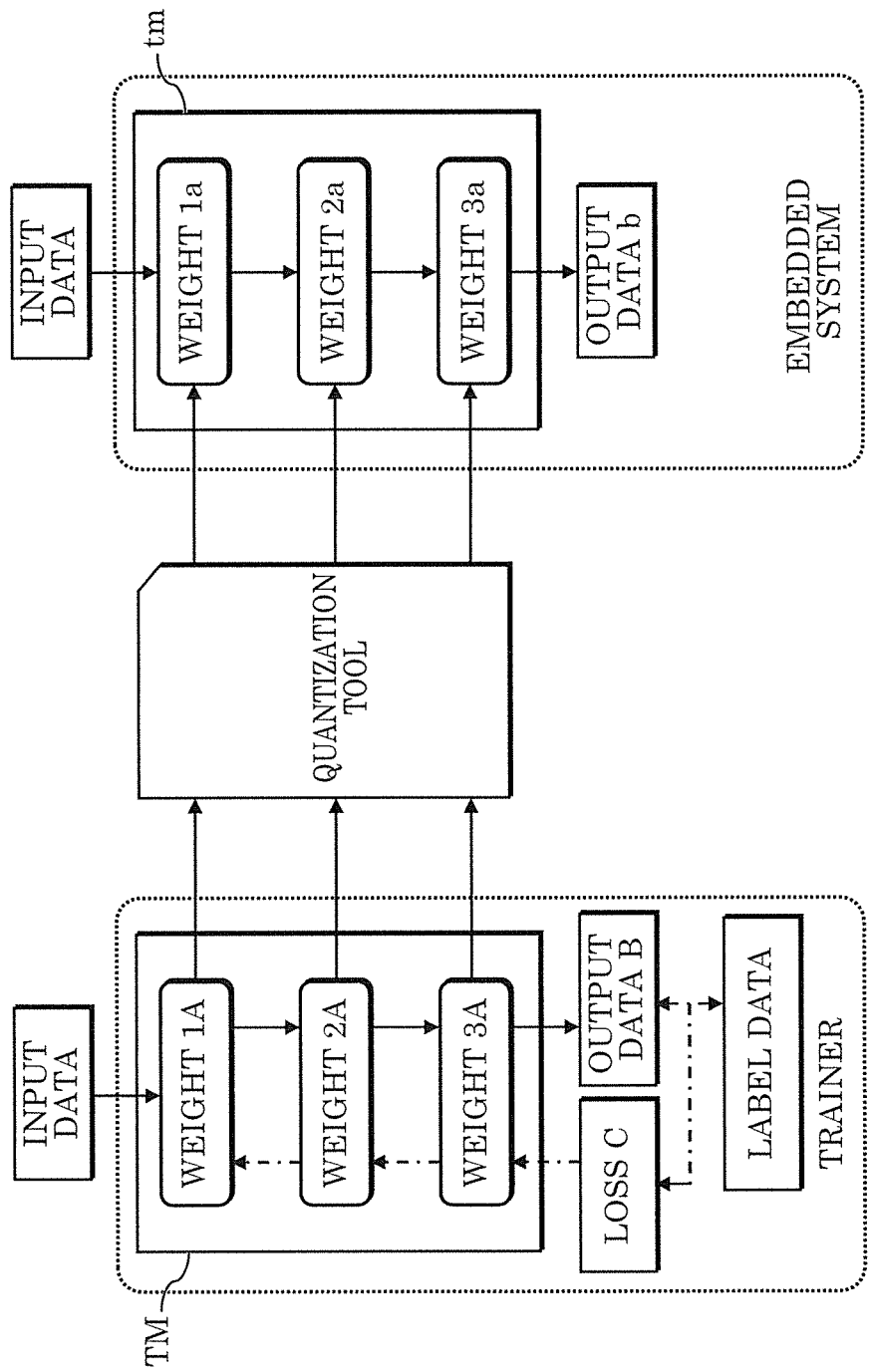
FIG. 1 is a diagram for describing an outline of training to acquire trained models and adoption thereof in an embedded system.

The trained models built in the computer as stated above are implemented in the embedded system after having been converted for compression in such a way that the trained models can be executed at the required speed under these limitations. FIG. 1 is a diagram for describing an outline of building trained models and adoption thereof in the embedded system. In this example, neural network trained model TM is built through training processes by a trainer. The trainer, for example, has a functional configuration that is built by executing a predetermined program on a personal computer that operates by receiving electric power from a commercial power source, and performs training processes using the number format FP32. Weights 1A, 2A, and 3A, which are parameters in this neural network, corresponding to nodes are converted by a quantization tool to an integer representation with fewer digits, such as a 16-bit or 8-bit integer representation. In others words, weights 1a, 2a, and 3a have been quantized. Since trained model tm including these parameters takes up fewer resources to execute than the original trained model TM, processing time can be reduced in the embedded system having a processor with slower processing speed or smaller memory than a personal computer.

In trained model tm acquired by being quantized in such a manner, however, inference output as a result of input may not always coincide with inference of the original trained model. Thus, trained model tm ordinarily has lower inference accuracy than the original trained model TM. In other words, a loss, which is a difference of label data (correct answer data) of input data, tends to be larger in trained model tm. However, when the embedded system, for example, serves as automatic driver assistance of an automobile in the above example or performs a recognition function during automatic driving, misdetection or failing to detect an object due to insufficient inference accuracy results in safety issues.

There is an existing method to improve the inference accuracy of the trained models. For example, in the trainer in FIG. 1, retraining is performed using a method called backpropagation. To give a broad explanation of how this method works, loss C, which is the difference between inference output data B and label data of input data corresponding to output data B, is first calculated, and then a weight of neurons is adjusted going back from an output layer to a previous stage using this loss (see, dash-dotted arrows in FIG. 1).

This method, however, is at most a method to lower the loss of the inference executed by the trainer in which a number format is used that is capable of high inference accuracy. Even when trained model TM is retrained to lower this loss, differences between output data b different from output data B and the label data will not necessarily become smaller, output data b being the inference result data in the embedded system. To rephrase, even when the loss of output data B is eliminated using this method, differences between output data b and the label data are not necessarily eliminated. Differences not eliminated in the embedded system are, using the example of the above automobile, linked to misdetection of or failure to detect objects on the outside of vehicles.

PTL 1 discloses steps of comparing (i) inference results of a CPU in a personal computer corresponding to the above trainer and (ii) inference results using an embedded chip corresponding to the embedded system in FIG. 1. In the following steps, the code of the program is fine-tuned, but since detailed information about how the comparison results are used after being fine-tuned are not included in the disclosure, the effects of the improvement of the inference accuracy in the embedded system cannot be known.

Using the technique disclosed in NPL 1, a conversion tool corresponding to the above quantization tool is embedded in an inference pass of the trained model performed in the personal computer corresponding to the above trainer. The trained model implemented in the embedded system is hereby virtually built in the personal computer. Next, this virtually-built trained model is retrained using the inference results thereof. With this, the problem of not being able to enhance the inference accuracy of the embedded system caused by discrepancies between the trained model in the personal computer and the trained model in the embedded system is solved. The method disclosed in NPL 1 assumes the contents of the conversion tool to be transparent. However, the contents of conversion tools, such as the quantization tool, are generally not made public by vendors who provide the framework including the tools, meaning that the tools are a black box to the user. In other words, the user of the conversion tool cannot use this method to eliminate the loss of output data b of trained model tm in the embedded system.

The present disclosure provides a usable data processing method for eliminating output errors of the trained model in the embedded system even when the user of the neural network cannot know the contents of the conversion tool as state above.

In a data processing method according to an aspect of the present disclosure, using a computer: inputting, in a third trained model, first output data corresponding to first input data for a first trained model to obtain second output data, the third trained model being acquired through training in which (i) output data of the first trained model is used as training data, and (ii) output data of a second trained model acquired by converting the first trained model is used as label data; obtaining first label data of the first input data; and retraining the first trained model using first differential data corresponding to differences between the second output data and the first label data.

This makes it possible to enhance the performance of the trained model after having been converted even when the contents of the trained model converted by the conversion tool are unknown since the trained model can be retrained based on differences (loss) of the label data of the output data that are inference results of the embedded system. To be specific, the output errors of the trained model in the embedded system are eliminated, and the inference accuracy of the embedded system can be enhanced.

For example, inputting, in a fourth trained model, the first differential data to obtain second differential data, the fourth trained model being acquired through training in which (i) differential data corresponding to differences between the output data of the second trained model and label data of the input data for the first trained model is used as training data, and (ii) differential data corresponding to differences between the output data of the first trained model and the label data corresponding to input data for the first trained model is used as label data; and the first trained model may also be retrained using the second differential data.

For example, when using differences from different environments as is in the retraining, the weighting may be adjusted excessively or insufficiently during the backpropagation, which may result in failure to enhance the inference accuracy or even lower the inference accuracy. Using this configuration, however, more accurate data can be acquired as the above differences used in the retraining so this type of situation does not occur easily, and efficiency of the retraining can be enhanced.

For example, the third trained model may be acquired through training in which the input data corresponding to the output data of the first trained model is used as additional training data, or the third trained model may also be acquired through training in which training parameters corresponding to the output data of the first trained model are used as additional training data.

This makes it possible to acquire more accurate data as output data of the embedded system to be inferred, and to improve the efficiency of the retraining.

For example, the first trained model and the second trained model are neural network trained models, and the training parameters may also be weights corresponding to nodes in a neural network.

This makes it possible to limit the risk of a decrease in precision when adopting a high-precision neural network acquired in a training environment in an embedded system with strict execution limitations.

For example, converting the first trained model compresses the neural network.

This makes it possible to enhance the performance of the trained model quantized in order to be used in the embedded system with stricter resource limitations than in the environment when the trained model is built.

For example, the third trained model may also be trained using the output data of the first trained model as training data, and the output data of the second trained model as label data. The fourth trained model may also be trained using (i) as training data, the differential data corresponding to the differences between the output data of the second trained model and the label data of the input data for the first trained model, and (ii) as label data, the differential data corresponding to the differences between the output data of the first trained model and the label data corresponding to the input data of the first trained model.

This makes it possible to obtain a simulation of the loss of the output data of the second trained model with usable data even in conditions when the contents of the quantization tool for acquiring the trained model to be used in the embedded system are a black box. This simulation is feedback provided to the first trained model and makes it possible to enhance the performance of the trained model using in the embedded system.

A data processing system according to an aspect of the present disclosure, including the computer: inputs, in the third trained model, the first output data corresponding to the first input data for the first trained model to obtain the second output data, the third trained model being acquired through training in which (i) the output data of the first trained model is used as training data, and (ii) the output data of the second trained model acquired by converting the first trained model is used as label data; obtains the first label data of the first input data; and retrains the first trained model using the first differential data corresponding to differences between the second output data and the first label data.

This makes it possible to enhance the performance of the trained model after having been converted even when the contents of the trained model converted by the conversion tool are unknown since the trained model can be retrained based on differences (loss) of the label data of the output data that are inference results of the embedded system. To be specific, the output errors of the trained model in the embedded system are eliminated, and the inference accuracy of the embedded system can be enhanced.

Hereinafter, the data processing method and data processing system according to the embodiment will be described concretely with reference to the drawings.

Note that the following embodiment shows a comprehensive or specific example. Therefore, numerical values, shapes, materials, components, placement and connection of the components, steps, the order of steps, and the like in the following embodiment are mere examples and do not to limit the present disclosure. Components according to the following embodiment not mentioned in any of the independent claims are described as optional additional components. Moreover, the drawings are schematic diagrams and do not necessarily provide strictly accurate illustrations.

Embodiment

Figure 2:
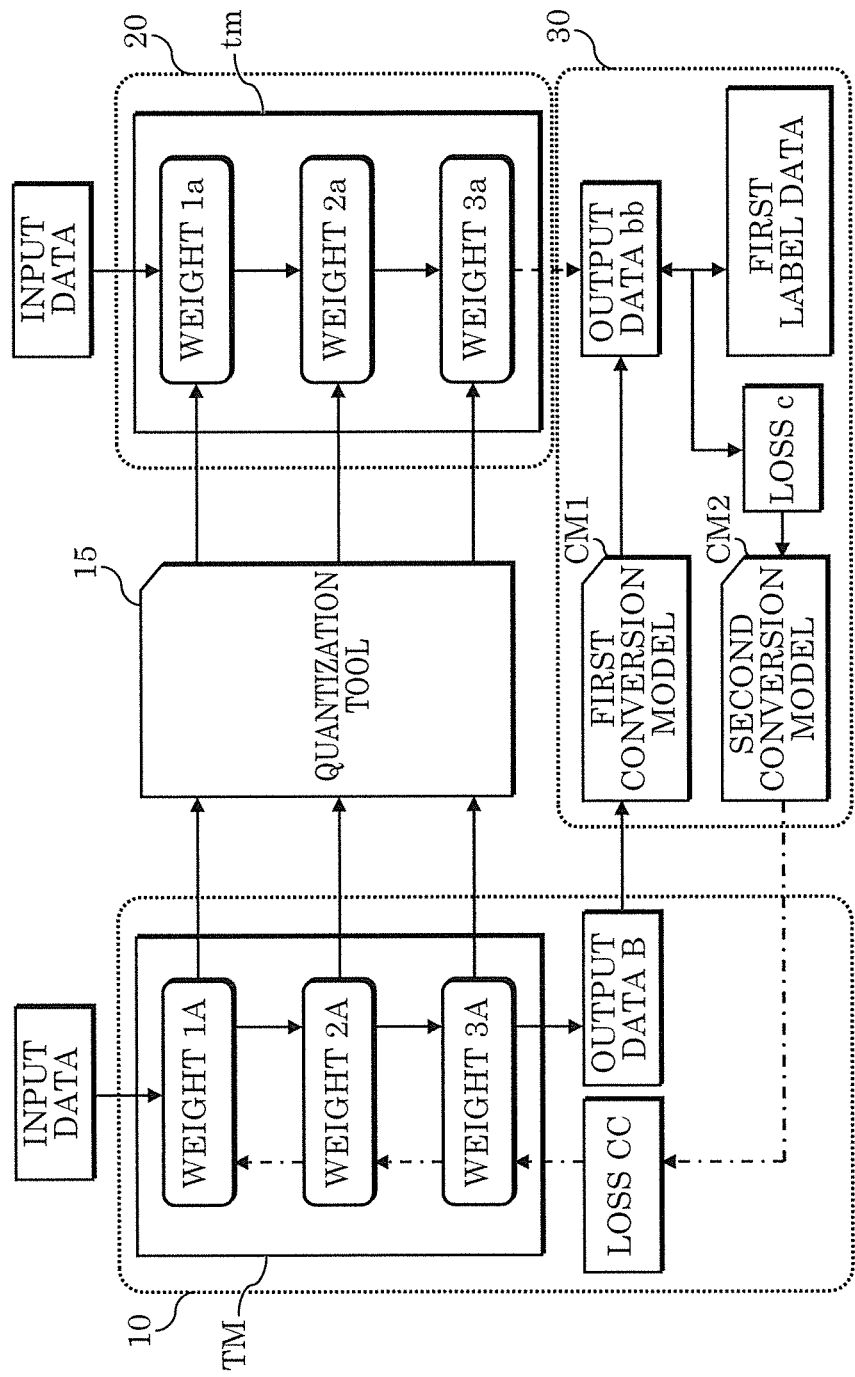
FIG. 2 is a diagram for describing an outline of a mechanism for reflecting output loss of a model in a trained model included in the embedded system according to an embodiment.

FIG. 2 is a diagram for describing an outline of a mechanism for reflecting output differences of a model of label data in a trained model included in the embedded system according to the embodiment. Hereinafter, a comparison with the circumstances shown in FIG. 1 not including this mechanism will be described.

Neural network trainer 10 is realized by, for example, executing a predetermined program with a processor in a personal computer and the like. Neural network trainer 10 employs a number format capable of high-precision inference, such as FP32, and builds trained model TM through training. Neural network trainer 10 can infer input data through the built trained model TM, and retrain trained model TM using differences between the input data and label data of output data being the inference result. These points are the same as shown in FIG. 1. Trained model TM is an example of a first trained model in the present embodiment.

Quantization tool 15 is the same as shown in FIG. 1, and a more compressed trained model tm is obtained by quantizing the weights in trained model TM that is built in neural network trainer 10. The quantization tool is included in a deep neural network software framework, such as TensorRT, Xtensa® Neural Network Compiler (XNNC), or CEVA Deep Neural Network (CDNN), and is to the user a black box.

Trained model tm is also the same as shown in FIG. 1, and is implemented in embedded system 20 that employs a number format that requires fewer processing resources than neural network trainer 10, such as 16-bit integers (int16) or 8-bit integers (int8). Trained model tm is an example of a second trained model in the present embodiment.

Feedback section 30 provides a loss of the output data loss of trained model tm as feedback to trained model TM, and is not present in the mechanism in FIG. 1.

First conversion model CM1 included in feedback section 30 is a trained model acquired through training in which the output data, which is the inference result of trained model TM, is used as training data, and the output data of trained model tm is used as label data. First conversion model CM1 is, for example, dependent on the neural network. First conversion model CM1 in feedback section 30 receives, as input, output data B corresponding to the input data for trained model TM, and obtains output data bb that is a simulation of the inference result of trained model tm. The reason that the arrow showing the output from trained model tm is a dashed line is because output data bb is simulated data and is not actually output by trained model tm. First conversion model CM1 is an example of a third trained model in the present embodiment. Moreover, output data B is an example of the first output data according to the present embodiment, and the input data corresponding to the first output data is an example of the first input data in the present embodiment. Moreover, output data bb is an example of the second output data in the present embodiment. In other words, the second output data is a simulation of the output data of the second trained model.

In feedback section 30, a loss calculator (not illustrated in FIG. 2, described later) further obtains label data of the first input data, and calculates loss c that is the difference between this label data and output data bb. The label data of the first input data, which is compared to output data bb by the loss calculator, is an example of the first label data in the present embodiment. Moreover, loss c is an example of the first differential data in the present embodiment.

Second conversion model CM2 is a trained model acquired through training in which (i) a loss that is the difference between the output data, which is the inference result of trained model tm, corresponding to certain input data, and label data of the input data is used as training data, (ii) and differences between the output data of trained model TM, and label data of input data corresponding to the output data are used as label data. Second conversion model CM2 is, for example, dependent on the neural network. Second conversion model CM2 in feedback section 30 receives, as input, loss c, and obtains loss CC that is a simulation of the output loss from trained model TM. Second conversion model CM2 is an example of a fourth trained model in the present embodiment, and loss CC is an example of the second differential data in the present embodiment. In other words, the second differential data is a simulation of the output data loss of trained model TM.

Neural network trainer 10 readjusts the weights in trained model TM using loss CC output by second conversion model CM2, i.e., retrains trained model TM.

Using such a mechanism, the simulated output data of trained model tin in embedded system 20 is first generated from the output of trained model TM in the personal computer. Trained model TM is then retrained using differences between this simulated output data and the label data of the input data corresponding to this simulated output data. This makes it possible to properly provide feedback of the inference result of the embedded system to trained model TM even when quantization tool is a black box and the contents of data converted by quantization tool 15 are unknown.

Note that loss c may also be used for retraining trained model TM without being converted to loss CC by second conversion model CM2. However, retraining using loss c as is may lower the inference accuracy of trained model TM due to a difference in specifications between trained model TM and trained model tin, in which the inference results are simulated, such as, different number formats being used. In such a case, there is a risk of the precision of trained model tm, which is acquired by converting trained model TM after being retrained, not being enhanced. Second conversion model CM2 is included in feedback section 30 to avoid such a situation when necessary.

Moreover, retraining steps in the present embodiment are not replaced by retraining steps shown in FIG. 1. It is not illustrated in FIG. 2, but the precision of trained model TM may also be improved using the retraining steps in FIG. 1.

Figure 3:
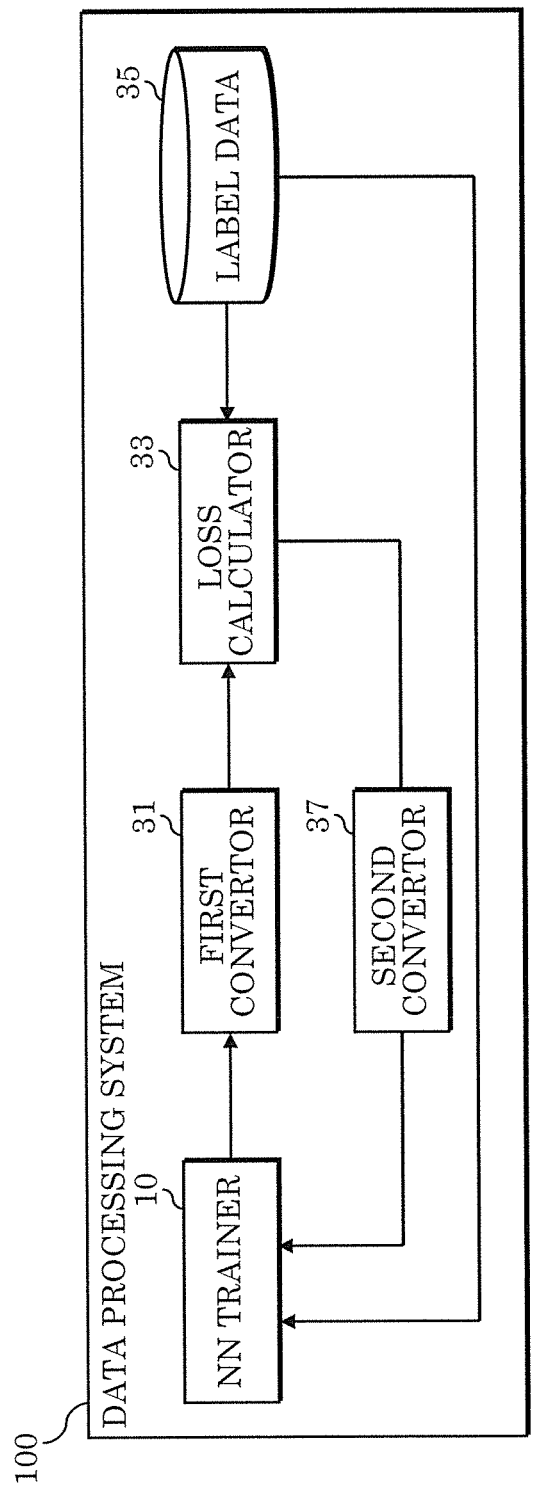
FIG. 3 is a block diagram showing a functional configuration of a data processing system for performing retraining steps in the embodiment.

A configuration to perform the retraining steps in the present embodiment will be described next. FIG. 3 is a block diagram showing a functional configuration of data processing system 100 for performing the above retraining steps in the embodiment.

Data processing system 100 is a system for training and retraining to acquire the trained model, and may be included in one or a plurality of computers. This trained model is acquired through training and retraining by neural network (abbreviated as NN in FIG. 3) trainer 10. Data processing system 100 includes, besides neural network trainer 10, first convertor 31, loss calculator 33, label data 35, and second convertor 37 as functional components.

First convertor 31 is a functional component realized by first conversion model CM1 in FIG. 2 being built using the processor included in the computer that contains data processing system 100. First convertor 31 converts output data B, which indicates the inference result of trained model TM using the built first change model CM1, and obtains and outputs output data bb that is a simulation of the output date indicating the inference result of trained model tm.

Loss calculator 33 is a functional component that is provided with data by a predetermined program that is executed by the processor included in the computer that contains data processing system 100. Loss calculator 33 receives output data bb and the first label data as input, calculates differences between both, and outputs the differences as loss c.

Label data 35 is stored in a storage device included in the computer that contains data processing system 100, and includes the first label data. Label data shown in FIG. 1 for calculating the loss neural network trainer 10 uses in the retraining is also included in label data 35.

Second convertor 37 is a functional component realized by second conversion model CM2 in FIG. 2 being built using the processor included in the computer that contains data processing system 100. Second convertor 37 converts loss c of the output date of trained model tm using the built second change model CM2, and obtains and outputs loss CC. Loss CC is used in the retraining of trained model TM by neural network trainer 10.

Note that the above first convertor 31, loss calculator 33, label data 35, and second convertor 37 may be realized on one computer, but may also be realized on separate computers. Neural network trainer 10 may also be realized on one computer or a plurality of computers.

A data flow and processing order in the above mechanism including the components described with reference to FIG. 3 will be described next.

Figure 4:
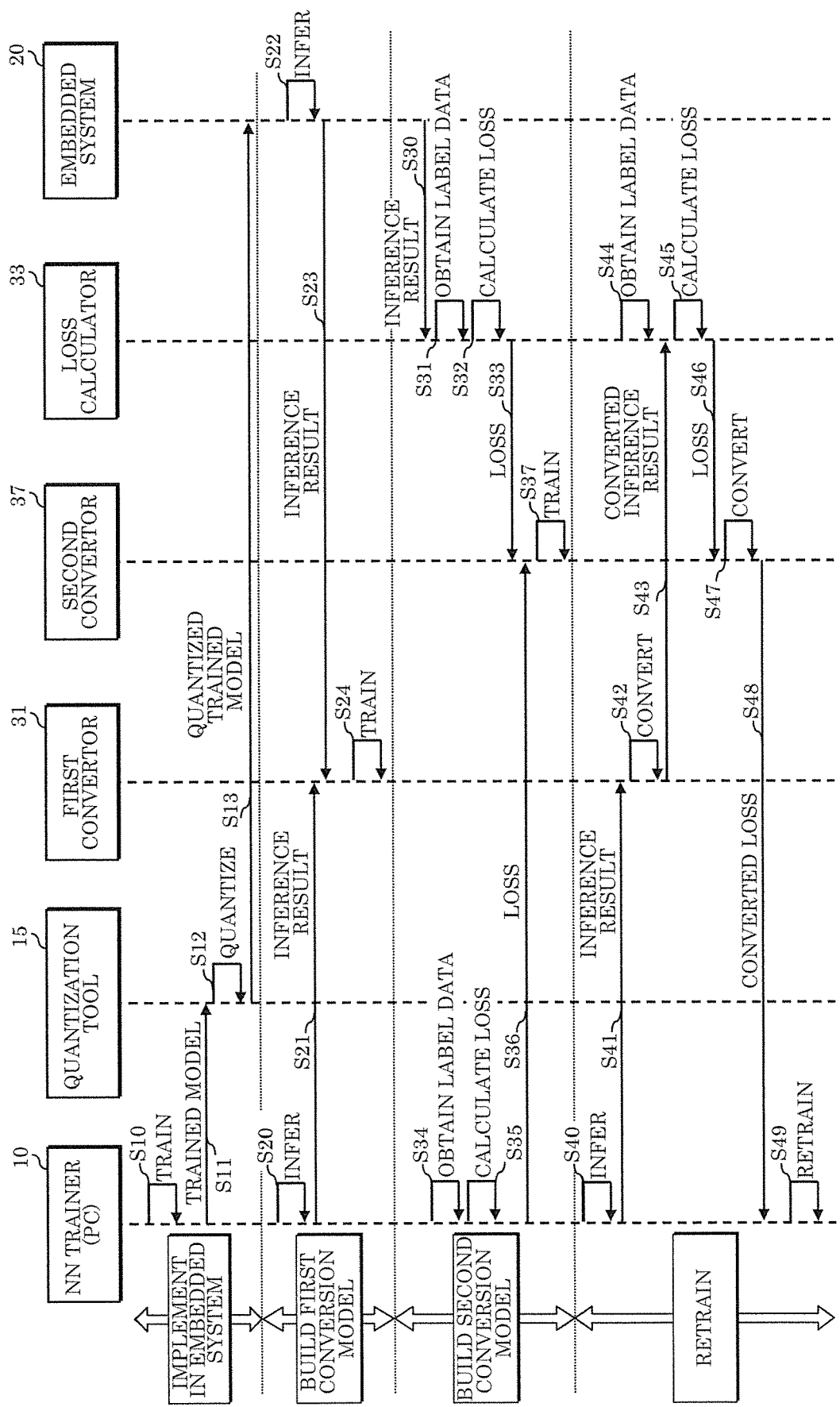
FIG. 4 is a sequence diagram chronologically showing a data flow in the embodiment.

FIG. 4 is a sequence diagram chronologically showing the data flow in the present embodiment. The data flow is described below in four separate phases.

First phase: from building the trained model to implementation in the embedded system.

Second phase: building the first conversion model through training.

Third phase: building the second conversion model through training.

Fourth phase: retraining.

Note that label data 35 is omitted in FIG. 4 for clarity.

In the first phase, trained model TM is first built in neural network trainer 10 through training in which training data and label data are used (step S10). It is not illustrated, but the inference accuracy of trained model TM may also be enhanced at this stage through retraining as shown in FIG. 1. The built trained model TM is input in quantization tool 15 (step S11) and quantized (step S12). The quantized trained model tin is implemented in embedded system 20 (step S13). This makes inference by trained model tm possible in embedded system 20.

In the second phase, inference is performed by trained model TM built in the first phase in neural network trainer 10 (step S20). Inference is also performed by trained model tm implemented in the first phase in embedded system 20 (step S22). Both inferences are executed using identical input data. Note that the input data for embedded system 20 may also be preprocessed.

First convertor 31, having obtained the inference results of trained model TM and trained model tm (steps S21 and S23), builds first conversion model CM1 through training in which the inference result of trained model TM is used as training data and the inference result of trained model tm is used as label data (step S24). Note that first conversion model CM1 built through the training processes performed earlier may also be obtained from a memory.

In the third phase, loss calculator 33 obtains the inference result of trained model tin (step S30), and also obtains the label data of the input data corresponding to the inference result (output data) from label data 35 (step S31). Loss calculator 33 then calculates the loss (differences) from the label data of the inference result of trained model tm.

On the other hand, neural network trainer 10 obtains the label data of the input data corresponding to the inference result (output data) of trained model TM from label data 35 (step S34), and calculates the loss (differences) from the label data of the inference result of trained model TM (step S35).

Second convertor 37, having obtained the loss of the inference result of trained model tm calculated by loss calculator 33 and the loss of the inference result of trained model TM calculated by neural network trainer 10 (steps S33 and S36), builds second conversion model CM2 through training in which the loss of the inference result of trained model tm is used as training data and the loss of the inference result of trained model TM is used as label data (step S37). Note that second conversion model CM2 built through the training processes performed earlier may also be obtained from the memory.

Feedback section 30 shown in FIG. 2 is built by data processing system 100 in the first phase to the third phase. In the fourth phase, data processing system 100 is executed being in this state.

In the fourth phase, the inference result executed by trained model TM in neural network trainer 10 (output data B) is converted by first conversion model CM1 in first convertor 31 (steps S40 to S42). The converted inference result (output data bb) is a simulation of the inference result by trained model tm from the input data corresponding to the inference result of trained model TM (output data B).

Loss calculator 33 having obtained output data bb (step S43) obtains the label data (first label data) of the input data corresponding to the inference result of trained model TM (output data B) from label data 35 (step S44). Loss calculator 33 then calculates the loss (differences) from the first label data of the inference result of the simulated trained model tm (step S45).

Second convertor 37 converts the loss of second conversion model CM2 (steps S46 and S47). Neural network trainer 10 obtains this converted loss (step S48), and uses the loss to retrain trained model TM (step S49).

After weights 1A to 3A are updated through retraining of trained model TM, retraining may be repeated by returning to the first phase executing the processes after the quantizing (step S12).

Variations

The data processing method and data processing system according to one or more aspects of the present disclosure are described above based on the embodiment, but the present disclosure is not limited thereto. Forms obtained by various modifications to the embodiments that can be conceived by a person skilled in the art which are within the scope of the essence of the present disclosure may also be included in the scope of the one or more aspects of the present disclosure.

Figure 5:
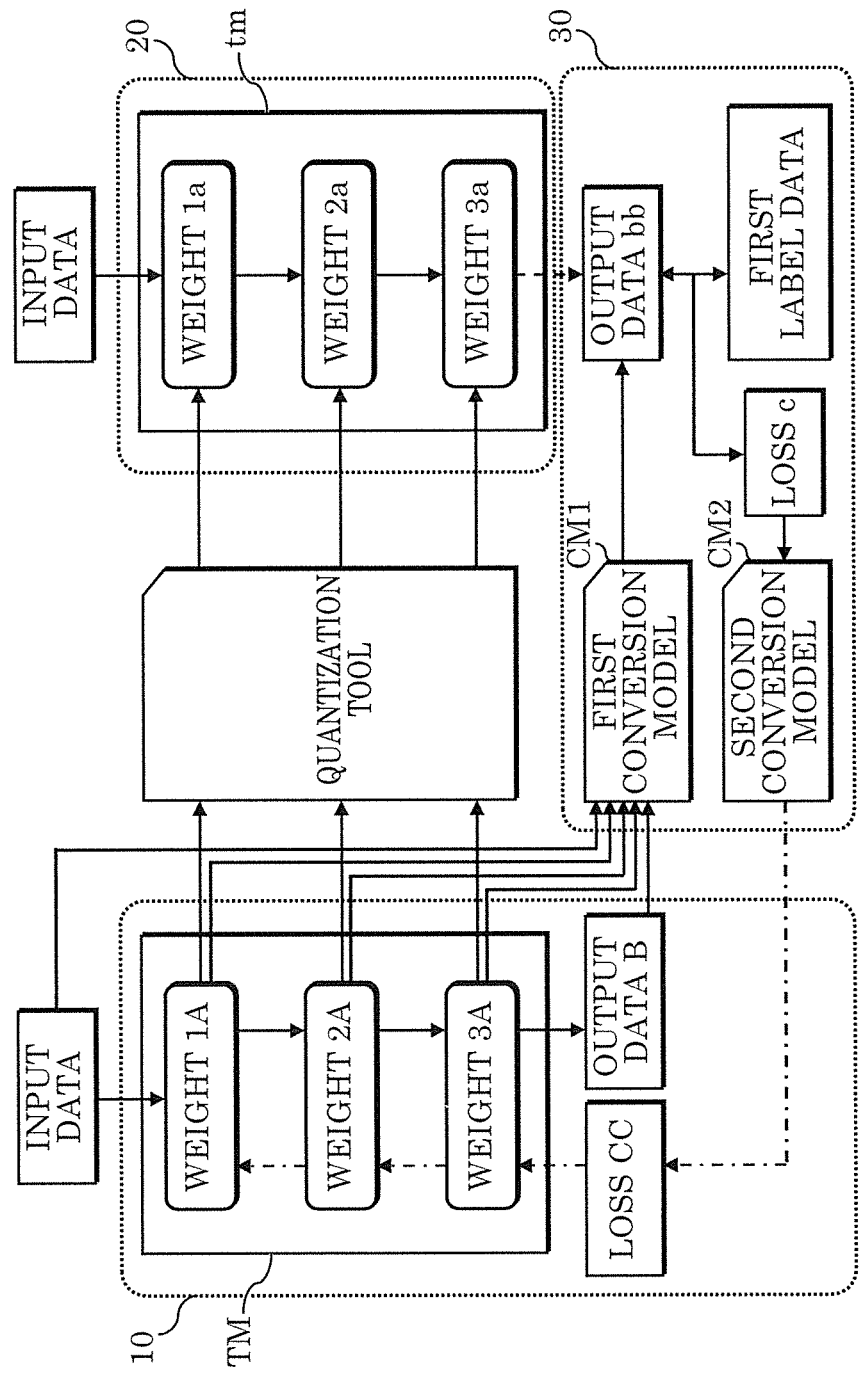
FIG. 5 is a diagram for describing an outline of a mechanism for reflecting output loss of the model in the trained model included in the embedded system according to a variation of the embodiment.

FIG. 5 is a diagram for describing an example of such a variation. Hereinafter, the differences with the mechanism shown in FIG. 2 will be mainly described.

A mechanism for reflecting, in a trained model, differences of label data in the present variation shown in FIG. 5, differs from the mechanism shown in FIG. 2 in that input data for the first conversion model includes input data corresponding to output data B and weights 1A to 3A that are parameters of trained model TM, in addition to output data B of trained model TM.

In other words, in the present variation, output data B, the input data corresponding to output data B, and the parameters of trained model TM are used as training data for building first conversion model CM1 in the second phase. In this manner, the parameters of trained model TM also used as the training data for training to acquire first conversion model CM1 are an example of training parameters according to the present variation.

This enables first conversion model CM1, which is acquired through training in which even more training data is used, to output output data bb for simulating the output data of trained model tm with greater precision.

Note that the data added to output data B as input data for the training data to be input in first conversion model CM1 and inference may also be only one of the input data corresponding to output data B and the parameters of trained model TM.

In another variation, loss c may be calculated using output data b instead of output data bb. In other words, the output data of the inference result of trained model tm may be used to calculate loss c without using first conversion model CM1.

In another variation, a change in the performance of trained model tm to be predicted may also be presented depending on the presence or absence of conversions using first conversion model CM1 and second conversion model CM2. For example, loss calculator 33 estimates changes in the precision of trained model tm from differences between the calculated loss c and loss C when only first conversion model CM1 is used. Moreover, loss calculator 33 estimates changes in the precision of trained model tm from differences between the calculated loss CC and loss C when first conversion model CM1 and second conversion model CM2 are used. A presentation device provided separately in the data processing system then presents the estimated changes in the precision of trained model tm. The presentation device may be a display, projector, speaker, or the like.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

Note that the performance of the trained models may also indicate the accuracy of the trained models.

A data processing method according to one example may be executed by a computer, and includes (i) inputting first detection result data corresponding to first input image data for a first trained model in a third trained model for object detection to obtain second detection result data, the third trained model being acquired through training in which detection result data output by the first trained model is used as training data, and detection result data output by second trained model acquired by converting the first trained model is used as label data, (ii) obtaining first label data of the first input image data, and (iii) retraining the first trained model using first differential data corresponding to differences between the second detection result data and the first label data.

INDUSTRIAL APPLICABILITY

The present disclosure can be applied in fields in which trained models are executed in a stricter environment than when being built, and can be applied in various types of industrial fields engaging in the Internet of Things, such as automobiles (including autonomous cars), consumer electronics, wearable technology, and industrial machinery.

What is claimed is:

1. A data processing method, comprising the following executed by a computer:
    inputting, in a third trained model, first output data corresponding to first input data for a first trained model to obtain second output data, the third trained model being acquired through training in which (i) output data of the first trained model is used as training data, and (ii) output data of a second trained model acquired by converting the first trained model is used as label data;
    obtaining first label data of the first input data; and
    retraining the first trained model using first differential data corresponding to differences between the second output data and the first label data.

2. The data processing method according to claim 1, comprising:
    inputting, in a fourth trained model, the first differential data to obtain second differential data, the fourth trained model being acquired through training in which (i) differential data corresponding to differences between the output data of the second trained model and label data of the input data for the first trained model is used as training data, and (ii) differential data corresponding to differences between the output data of the first trained model and the label data of input data for the first trained model is used as label data; and
    retraining the first trained model using the second differential data.

3. The data processing method according to claim 1, wherein
    in the training through which the third trained model is acquired, the training data further includes the input data corresponding to the output data of the first trained model.

4. The data processing method according to claim 1, wherein
    in the training through which the third trained model is acquired, the training data further includes training parameters corresponding to the output data of the first trained model.

5. The data processing method according to claim 4, wherein
    the first trained model and the second trained model are neural network models, and
    the training parameters are weights corresponding to nodes in a neural network.

6. The data processing method according to claim 5, wherein
    the converting of the first trained model compresses the neural network.

7. The data processing method according to claim 1, comprising:
    training using the output data of the first trained model as training data and the output data of the second trained model as label data to acquire the third trained model.

8. The data processing method according to claim 2, comprising:
    training using (i) as training data, the differential data corresponding to the differences between the output data of the second trained model and the label data of the input data for the first trained model, and (ii) as label data, the differential data corresponding to the differences between the output data of the first trained model and the label data corresponding to the input data of the first trained model to acquire the fourth trained model.

9. A data processing system, comprising:
    a computer that:
        inputs in a third trained model first output data corresponding to first input data for a first trained model to obtain second output data, the third trained model being acquired through training in which (i) output data of a first trained model is used as training data, and (ii) output data of a second trained model acquired by converting the first trained model is used as label data;
        obtains first label data of the first input data; and
        retrains the first trained model using first differential data corresponding to differences between the second output data and the first label data.

10. A data processing method, comprising the following executed by a computer:
    inputting, in a third trained model for object detection, first detection result data corresponding to first input image data for a first trained model to obtain second detection result data, the third trained model being acquired through training in which (i) detection result data output by the first trained model is used as training data, and (ii) detection result data output by second trained model acquired by converting the first trained model is used as label data;
    obtaining first label data of the first input image data; and
    retraining the first trained model using first differential data corresponding to differences between the second detection result data and the first label data.

* * * * *